US012589583B2

(12) United States Patent
Pompeani et al.

(10) Patent No.: US 12,589,583 B2
(45) Date of Patent: Mar. 31, 2026

(54) METHOD FOR FABRICATING AN ASSEMBLY FOR A CARD AND A CARD COMPRISING A METALLIZED FILM, A MICROCIRCUIT CARD AND AN ASSEMBLY FOR SAID CARD

(71) Applicant: IDEMIA FRANCE, Courbevoie (FR)

(72) Inventors: Sylvie Pompeani, Courbevoie (FR); Joseph Guyon Le Bouffy, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 250 days.

(21) Appl. No.: 18/309,040

(22) Filed: Apr. 28, 2023

(65) Prior Publication Data

US 2023/0364899 A1    Nov. 16, 2023

(30) Foreign Application Priority Data

May 10, 2022    (FR) ..................................... 22 04422

(51) Int. Cl.
*B32B 15/08*        (2006.01)
*B32B 7/028*        (2019.01)
        (Continued)
(52) U.S. Cl.
CPC ............ *B32B 37/025* (2013.01); *B32B 7/028* (2019.01); *B32B 7/06* (2013.01); *B32B 15/08* (2013.01);
        (Continued)
(58) Field of Classification Search
CPC .. B32B 7/028; B32B 7/04; B32B 7/06; B32B 7/12; B32B 15/00; B32B 15/04;
        (Continued)

(56) References Cited

U.S. PATENT DOCUMENTS 8,881,373 B1    11/2014  Koepp et al.
9,460,380 B1    10/2016  Koepp et al.
        (Continued)

FOREIGN PATENT DOCUMENTS

WO      WO 2005/088697 A1    9/2005
WO      WO 2018/202774 A1    11/2018

OTHER PUBLICATIONS

French Preliminary Search Report & Written Opinion Issued Dec. 12, 2022 in French Application 22 04422 filed on May 10, 2022 (with English Translation of Categories of Cited Documents), 9 pages.

*Primary Examiner* — Michael A Tolin
(74) *Attorney, Agent, or Firm* — Oblon, McClelland, Maier & Neustadt, L.L.P.

(57)        ABSTRACT

A method for fabricating a metallized assembly for a microcircuit card exhibiting a metallized effect, the assembly forming an internal layer of the card. The method comprises providing a support layer formed of a plastic material sensitive to heat exhibiting a first shrinkage ratio, the support layer having, on a surface, at least the dimensions of a microcircuit card, providing a metallized film held on a first non-adhesive bearing liner, the first non-adhesive bearing liner exhibiting a shrinkage ratio less than that of the support layer, transferring the metallized film onto the support layer by applying heat and pressure, and removing the first non-adhesive bearing liner. Also provided are a method for fabricating a microcircuit card and a microcircuit card obtained by this method.

12 Claims, 3 Drawing Sheets

(51) Int. Cl.
B32B 7/06 (2019.01)
B32B 37/00 (2006.01)
B32B 37/06 (2006.01)

(52) U.S. Cl.
CPC .......... B32B 37/0015 (2013.01); B32B 37/06 (2013.01); B32B 2037/0092 (2013.01); B32B 2255/205 (2013.01); B32B 2307/412 (2013.01); B32B 2425/00 (2013.01)

(58) Field of Classification Search
CPC ....... B32B 15/08; B32B 15/082; B32B 15/09; B32B 15/20; B32B 37/0007; B32B 37/0015; B32B 37/025; B32B 37/04; B32B 37/06; B32B 37/10; B32B 2037/268; B32B 2255/10; B32B 2255/205; B32B 2307/412; B32B 2307/734; B32B 2307/736; B32B 2425/00; G06K 19/02; G06K 19/07722
See application file for complete search history.

(56) References Cited

U.S. PATENT DOCUMENTS

| | | | |
|---|---|---|---|
| 10,583,683 B1 * | 3/2020 | Ridenour | ............... B42D 25/23 |
| 2011/0031319 A1 | 2/2011 | Kiekhaefer et al. | |
| 2012/0325914 A1 * | 12/2012 | Herslow | ................ B32B 37/02 |
| | | | 428/209 |
| 2020/0023664 A1 * | 1/2020 | Roche | ................... B32B 27/308 |
| 2021/0117744 A1 | 4/2021 | Finn et al. | |

* cited by examiner

METHOD FOR FABRICATING AN ASSEMBLY FOR A CARD AND A CARD COMPRISING A METALLIZED FILM, A MICROCIRCUIT CARD AND AN ASSEMBLY FOR SAID CARD

The invention relates to the field of the fabrication of microcircuit cards, also called chip cards, and more particularly that of the cards exhibiting a visual effect, notably a metallized effect. Typically, chip cards have a rectangular parallelepipedal form with dimensions of 53.98 mm*85.60 mm and of very small thickness, less than 1 mm, between 760 and 840 μm. These dimensions are specified by the ISO 7816 standard under the designation ID-1.

It is known practice to fabricate this type of card by superposing several layers of plastic material then hot-pressing them during a lamination step, in order to join the layers to one another.

The layers made of plastics can be composed of one or more substrates of polymer, such as PVC, polyesters (PET, PETf or PETg), polycarbonate (PC) or even ABS. These substrates can also receive printing or carry a passive electronic component such as an antenna.

The lamination operation is performed by means of presses provided with lamination plates between which the layers are heated and pressed to obtain adjoining of the layers by fusion of the material at the interface of the layers.

Traditionally, the layers are initially in large formats or sheets typically grouping together 24 or 48 placements for microcircuit cards of ID-1 format. After the lamination of the layers, the cards are cut individually to the ID-1 dimensions by punching. According to a variant, the layers have the dimensions adapted to form a single card.

In order to obtain aesthetic effects, it is known practice to offer ink prints on the layers. The printing techniques are, for example, the (offset) lithography technique or the silkscreen printing technique. It is also known practice to produce cards with a metallized effect. This effect is obtained from a thin metallization film, of a thickness less than 0.01 μm, deposited on a substrate of polyester (also called PET, polyethylene terephthalate). The PET substrate covered with the metallized film is then laminated with other substrates. The prior art document US2011/0031319 describes the use of decorative foil with metallic appearance in a bank card comprising at least one layer of PET.

This PET layer is traditionally used for the cards with metallized effect, because its behaviour is relatively stable to lamination, that is to say that it deforms little after having been heated to high temperature, that is to say greater than 90° C., preferably 150° C., and placed under a pressure greater than 60N, preferably between 60N and 150N for around ten minutes.

In fact, after a lamination step, plastic material shrinkage phenomena occur during the cooling, that is to say the reverse of the expansion phenomenon that occurs during the rise in temperature from ambient temperature to the hot lamination temperature. The shrinkage is the process which leads to a reduction of the initial dimensions of a part having undergone heating and having then been cooled.

The low shrinkage ratio of the PET layer, that is to say its expansion or shrinkage coefficient close to zero (less than 0.1% at 150° C.), renders the PET layer stable to high temperature and makes it possible to avoid deformations of the other layers and notably of the metallized film. Its use therefore makes it possible to avoid a displacement of orientation of the metal particles and to keep a uniform visual effect of the metallized effect over the entire surface of the card. This is important so that the metal particles reflect the light according to the initial pattern of the metallized film as it was deposited before the lamination step.

Traditionally, the constituent materials of the card (in practice PVC, a mixture of PVC/ABS, PC, PETg) have expansion/shrinkage coefficients of several percentage points at 130° C., typically of the order of 3% or more, possibly reaching around 10% for PVC, and lying between 3 and 6% for PETg. It follows therefrom that, during the cooling of the hot laminated card, the shrinkage of the layers and of the overlays deforms the metallized film which is not sensitive to the change of temperature. The metallized film is therefore forced to ripple.

The presence of PET guarantees a limited, or zero, shrinkage, and therefore that the metallized film not be distorted.

However, when the PET is laminated with other substrates, the shrinkage ratio thereof being different from that of the other plastics, that leads to the deformation of the structure of the card, and the appearance of curving.

To address this problem of curving, it is known practice from the prior art to compensate the effect of the PET with a second layer of PET incorporated in the thickness of the card, on the opposite side. The card then has a symmetrical or quasi-symmetrical structure with respect to the central plane of thickness. However, the addition of this second layer of PET is restrictive in that it occupies an additional thickness in a product whose dimensions are highly constrained, namely a thickness less than 0.84 mm.

In order to mitigate this problem, the invention proposes a novel method for fabricating an assembly for a card with metallized effect, this novel method making it possible to dispense with a layer of PET in the assembly and the card with metallized effect.

To this end, the invention proposes a method for fabricating a metallized assembly for a microcircuit card exhibiting a metallized effect, the assembly forming an internal layer of this card, characterized in that it comprises the following steps: addition of a support layer formed by a plastic material sensitive to heat exhibiting a first shrinkage ratio, the support layer having, on the surface, at least the dimensions of a microcircuit card, addition of a metallized film held on a first bearing liner made of non-adhesive plastic material, the bearing liner exhibiting a shrinkage ratio less than that of the support layer, transfer of the metallized film onto the support layer by the application of heat and pressure on a surface of the support layer, removal of the first bearing liner.

In the present invention, the term shrinkage ratio corresponds to a ratio between its initial size after having been heated and then cooled. It is the ratio between the length or width of the initial card and the length and width of the card after having undergone a heat treatment. Since the thickness is insignificant with respect to the width and length dimensions, it will not be taken into account in assessing the shrinkage ratio.

By virtue of this method, it is possible to produce an assembly for a card comprising a metallized film while dispensing with the presence of a layer of PET in this assembly. The temporary placement of a bearing liner with low shrinkage ratio during the transfer step guarantees that the metallized effect of the film is not deformed. The metallized particles therefore keep their initial orientation. The presence of the bearing liner also guarantees the stability of the support layer during this transfer step and the limiting of its shrinkage after the support layer has been subjected to a high temperature over all or part of its surface. Thus, the support layer is not deformed locally by the transfer step and keeps its structure and its initial dimensions, that is to say those before transfer.

Advantageously, the transfer of the metallized film is performed after the passage of the support layer and of the metallized film between two rollers, continuously, or between two plates, sheet-by-sheet, or between a roller and a plate, the dimensions of the surface of the roller and of the plate being at least equal to the dimension of a microcircuit card.

Advantageously, the transfer is performed at a temperature higher than the glass transition temperature of the support layer, between 90° C. and 170° C.

Advantageously, the transfer of the metallized film is performed by the application of heat and pressure on a surface covering at least all of the support layer.

Advantageously, the support is made of PVC, a mixture of PVC-ABS, PC, PETg.

Advantageously, the first non-adhesive bearing liner is made of PET.

The invention also relates to a method for fabricating a card with metallized effect, further comprising the following steps: addition of at least one central layer covered with a print and positioning of this central layer on the support layer, on the side opposite to the metallized film, then addition of a transparent substrate on the central layer, on the side opposite to the support layer, the transparent substrate being intended to form an outer face of the microcircuit card, addition of a second liner on the metallized film, the second liner exhibiting a shrinkage ratio less than that of the support layer, assembly by lamination at a temperature higher than the glass transition temperature of the support layer, removal of the second bearing liner.

According to other features:
the second liner is a sheet of PET,
the method further comprises a step of printing on the metallized film,
the method comprises an additional step of deposition of varnish on the metallized film,
the method comprises the addition of a transparent overlay layer on the metallized film, then a step of lamination at a temperature lower than the glass transition temperature of the support layer,
the central layer covered with a print comprises a substrate comprising an antenna.

According to another aspect, the invention proposes a microcircuit card comprising a metallized film and only plastic layers sensitive to heat and exhibiting a shrinkage ratio greater than 0.5% at a temperature of between 90° C. and 170° C.

According to another aspect, the invention proposes an assembly for a card, this assembly comprising a metallized film and only one plastic layer sensitive to heat and each having a shrinkage ratio greater than 0.5% at a temperature of between 90° C. and 170° C.

Other features and advantages of the invention will emerge from the following description given by way of illustrative and nonlimiting example in light of the attached drawings, in which.

The expressions top, bottom, below, above, inner, outer are given in a purely illustrative manner for a better understanding of the invention.

It will be understood hereinafter in the description that the layers or substrates correspond to the stacked layers or substrates of a single card or even to the layers or substrates forming stacked sheets and from which several cards are then cut.

Figure 1:
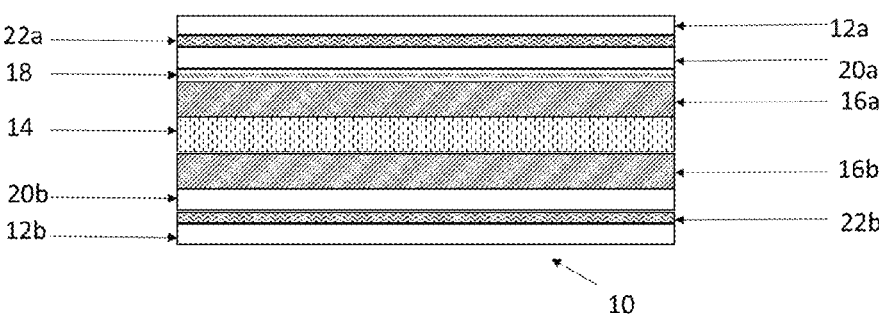
FIG. 1 represents a schematic view of a cross-sectional view of a card structure according to the prior art.

The microcircuit card 10 represented in FIG. 1 represents a card with metallized effect according to the prior art. As is known, this card 10 comprises a stacking of several layers, including two overlay substrates 12a, 12b forming the outer layers of the card 10, usually transparent and made of plastic material in PVC. The card 10 also comprises a central layer 14 made of PVC possibly bearing an antenna and other electronic components. On either side of this central layer 14 there are support layers 16a, 16b made of PVC, or of other plastic materials such as polycarbonate PC, ABS or PETg. At least one of these support layers 16a is intended to accommodate the metallized film 18, disposed on the side opposite the central layer 14. Provision can be made for each of the two support layers 16a, 16b to receive a metallized film 18. A substrate of PET 20a covers the metallized film 18 in order to limit the deformation thereof as indicated in the preamble of the description.

In order to avoid a curved effect of the card 10, that is to say an effect of curvature of the card 10, the structure of the prior art comprises a second substrate of PET 20b, placed in the bottom part of the card 10, substantially symmetrically to the first substrate of PET 20a with respect to the central plane of the card 10. This second substrate made of PET 20b ensures the flatness of the card 10 in that it compensates the curved effect due to the presence of the first substrate made of PET 20a in the top part of the card 10.

A printing layer 22a, 22b is also provided in the top and bottom parts, on the inner side of the overlays 12a, 12b. These printing layers 22a, 22b can possibly be deposited on the inner face of the overlay substrates 12a, 12b, or on the outer face of the substrates made of PET 20a, 20b. The assembly formed in the prior art therefore necessitates a large number of layers, the aggregation of the thicknesses of which must meet the specifications of the ISO 7816 standard, namely a thickness of between 760 μm and 840 μm. To address this problem, layers or substrates with thin thicknesses are generally chosen, which increases the fabrication cost of the card 10.

Figure 2:
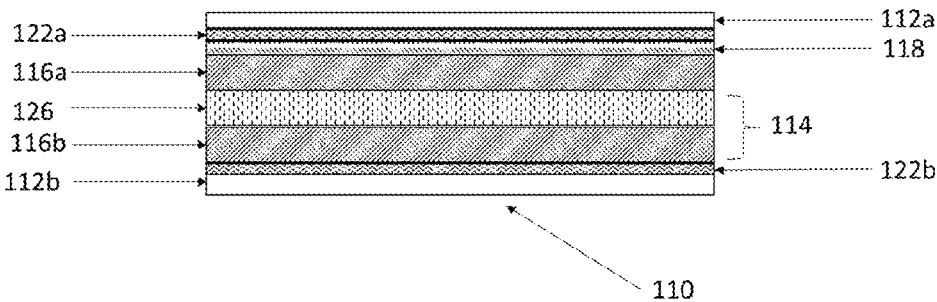
FIG. 2 represents a schematic view of a cross-sectional view of a card structure according to the invention.

FIG. 2 represents a cross-sectional view of a structure of a card 110 according to the invention. The structure of this card 110 is novel in that it does not include a substrate made of PET. Indeed, as can be seen in FIG. 2, the card 110 comprises overlay substrates 112a, 112b, a central layer 114, two support layers 116a, 116b disposed respectively on either side of the central layer 114 and a metallized film 118 sandwiched between one of the support layers 116a, 116b and one of the overlay substrates 112a, 112b. The support layers 116a, 116b and the central layer 114 and the overlay substrates are of plastic material sensitive to heat, exhibiting substantially the same deformation properties after having been subjected to a heat treatment. A plastic layer sensitive to heat is understood to be one whose behaviour is not stable, that is to say that exhibits a non-zero shrinkage ratio, greater than 0.5%, when it is subjected to high temperatures between 90° C. and 170° C. As an example, PVC exhibits a shrinkage ratio of between 5 and 10% at 140° C. Conversely, a material will be considered to be stable and insensitive to heat if it exhibits a shrinkage ratio close to zero, less than 0.5%, such as PET. The card 110 represented in FIG. 2 is obtained in several fabrication steps. More specifically, it results from the combination of a first assembly step, forming an assembly 124 represented in FIGS. 3a and 3b, and a second assembly step, assembling the assembly 124 with other layers and substrates. Hereinafter in the description, this second assembly step will be described in the form of two successive assembly substeps.

The structure of the assembly 124, illustrated schematically by FIGS. 3a and 3b, and the fabrication method thereof, will be described first.

Figure 3A:
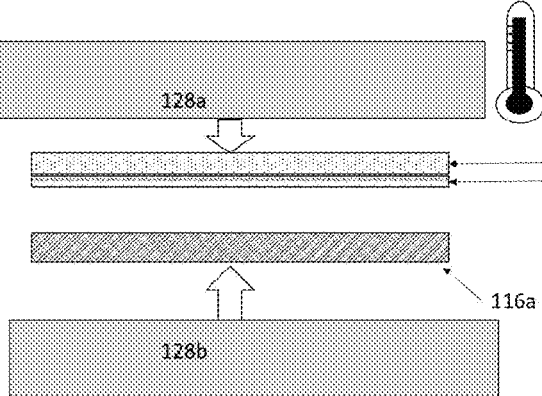
FIGS. 3a and 3b represent steps in fabricating an assembly for a card according to the invention.
Figure 3B:
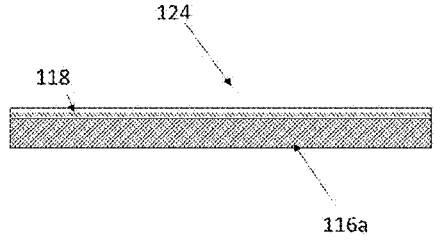

The assembly 124 of FIG. 3b comprises a support layer 116a formed by a polymer plastic material such as PVC, an ABS-PVC mixture, PC, PETg, that is sensitive to heat and exhibits a first shrinkage ratio that is non-zero, that is to say greater than 0.5% between 90° C. and 170° C., and a metallized film 118 pressed against a first face of the support layer 116a.

The method for fabricating this assembly 124 is performed as follows: the support layer 116a is provided and then a metallized film 118 is positioned, held on a first non-adhesive bearing liner 120a, also called liner, facing the support layer 116a, as illustrated in FIG. 3a. The metallized film 118 held on the first bearing liner 120a is then positioned on the support layer 116a, and the three elements are subjected to the application of pressure, within the pressure value ranges indicated in the preamble of the description, and of heat, between 90 and 170° C., on the surface of the support layer, in order to perform the transfer of the metallized film 118 onto the support layer 116a. After the cooling of the assembly 124, when the behaviour of the support layer 116a is stable, the first bearing liner 120a is then removed.

The material of the first bearing liner 120a is chosen so as to exhibit a shrinkage ratio close to zero, so as not to deform the metallized film 118. This shrinkage ratio is chosen to be lower than the shrinkage ratio of the support layer 116a. According to a particular embodiment, the first bearing liner 120a is made of PET and the support layer 116a is made of PVC plastic material. During the transfer step, that is to say during the rise to high temperature followed by the cooling, the first bearing liner 120a is deformed little because of its low shrinkage ratio. The temperature is increased gradually up to a maximum value of between 90° C. and 170° C. which is higher than the glass transition temperature of the support layer 116a. The bearing liner holds the metallized film 118 but also the support layer 116a such that the behaviour thereof remains stable, even beyond its glass transition temperature. As long as the bearing liner 120a is present, the support layer 116a and the metallized film 118, held on the bearing liner 120a, deform little or not at all. Next, after the cooling of the assembly 124, the bearing liner 120a is then removed. The metallized film 118 remains positioned on the support layer 116a.

In order to guarantee the good adhesion of the metallized film 118 on the support layer 116a, a layer of adhesive is deposited on the metallized film 118, on the side opposite the bearing liner 120a. This adhesive is activated by the rise in temperature during the transfer step.

According to a variant in which the entire surface of the card exhibits a metallized effect, the metallized film 118 is checked to ensure that it has dimensions equal to or greater than that of the support layer 116a so as to guarantee the total covering of a card surface or of a sheet of several cards.

According to a variant of the fabrication method, the transfer of the metallized film 118 is performed by continuous deposition between two rollers to allow continuity of feed of the layers on the production lines.

According to another variant, the transfer is performed on a support layer in sheet format having a determined number of placements of cards of ID-1 format. The transfer can then be performed when the support layer 116a in sheet format is sandwiched between a roller and a press plate, or even between two press plates 128a, 128b, the latter mode being illustrated in FIG. 3a. During the application of these transfer techniques, checks will be carried out to ensure that, whatever the dimensions of the film, the first bearing liner 120a does indeed cover at least all of the theoretical contact surface between the support layer 116a and the roller or the press plate. According to a variant, the first bearing liner 120a covers all of the surface of a card or all of the surface of one or more card placements.

Figure 4:
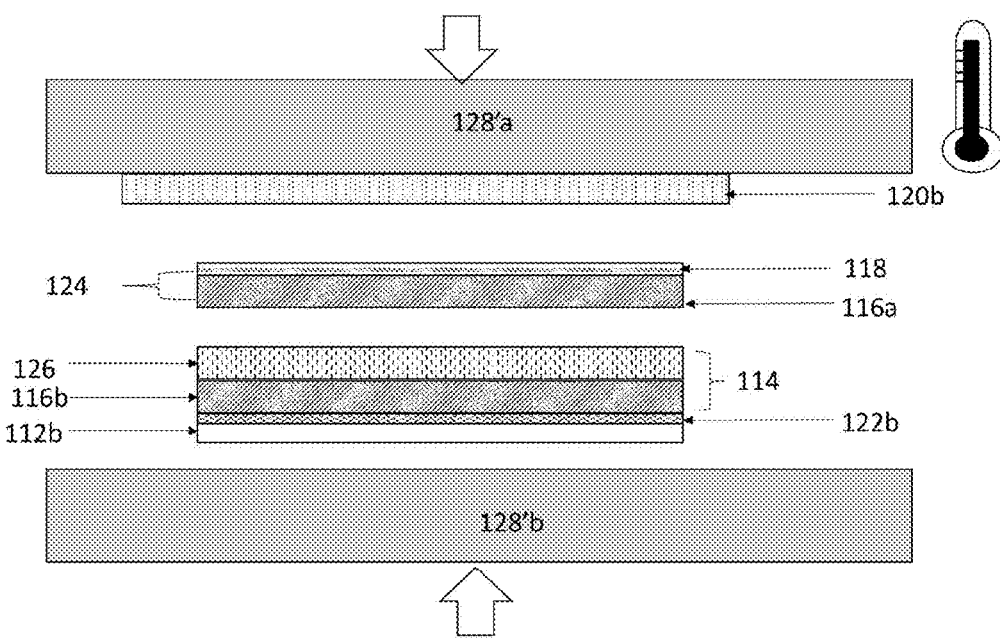
FIG. 4 represents an intermediate step of the method for fabricating a card according to the invention.

After the production of the assembly 124 illustrated in FIG. 3b, the second assembly step is carried out, comprising a first substep, illustrated in FIG. 4, comprising the addition of at least one central layer 114 possibly covered by a print 122b and its positioning on the support layer 116a on the side opposite the metallized film 118. A transparent overlay substrate 112b is positioned facing the central layer 114, on the side opposite to the support layer 116a.

The central layer 114 and the transparent overlay substrate 112b are fabricated from plastic materials that are sensitive to heat such as PVC, a PVC-ABS mixture, pETg, or PC.

In the first assembly substep of FIG. 4, the assembly 124, the central layer 114 and the transparent overlay substrate 112b are then laminated, that is to say placed under pressure between two lamination plates 128'a, 128'b, similar to those of FIG. 3a, at high temperature, for example 150° C. Furthermore, a second non-adhesive bearing liner 120b with low shrinkage ratio, such as PET, is positioned on top of the metallized film 118, between the film 118 and the lamination plate, to limit the shrinkage of the support layer 116a and protect the film 118, as was explained for the step of fabrication of the assembly 124. This second non-adhesive bearing linear 120b is produced in a plastic material that is not sensitive to heat, for example PET, and has surface dimensions greater than those of at least one card to be formed. It is then removed after the first assembly substep.

Provision can be made to add a print layer 122a on the metallized film 118 before the lamination of the first assembly substep. A primer can be deposited on the metallized film 118 before the print layer to guarantee the good adhesion of the ink.

Next, in a second assembly substep, a protective layer is added on the side opposite to the transparent overlay substrate 112b. This protective layer is added, after the first substep, more particularly after cooling to ambient temperature and removal of the second non-adhesive liner 120b.

Figure 5:
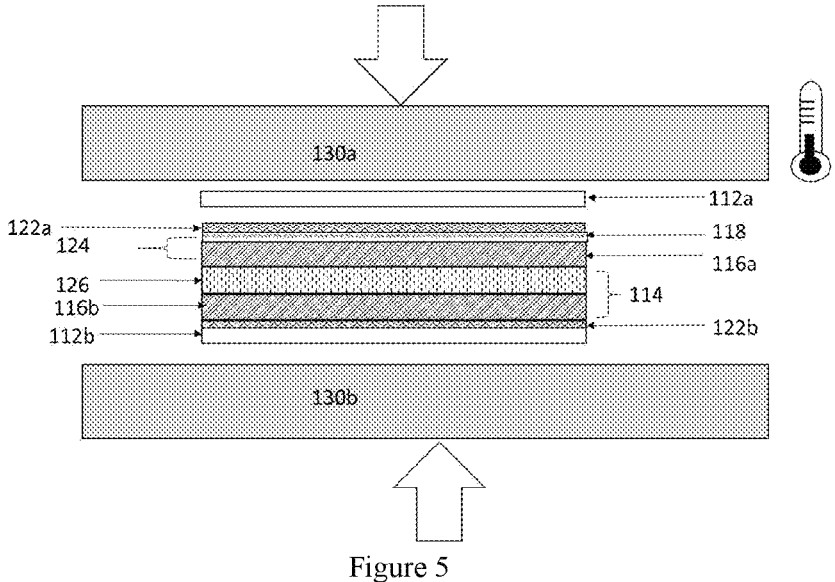
FIG. 5 represents the final step of the method for fabricating a card with metallized effect according to one embodiment.

According to a variant, illustrated in FIG. 5, this protective layer is formed by a transparent overlay substrate 112a. According to this variant, the card 110 comprises two transparent overlay substrates 112a, 112b, respectively forming the outer top layer and the outer bottom layer of the card 110.

The transparent overlay substrate 112a is assembled with the assembly 124, the central layer 114 and the transparent overlay substrate 112b in a lamination step at low temperature illustrated in FIG. 5 between two lamination plates 130a, 130b, at low temperature. The low temperature of the lamination step is lower than the glass transition temperature of the support layer 116a, such that the support layer 116a, the transparent overlay substrate 112*b* and the central layer 114 do not undergo any deformation. This temperature is lower than 90° C. for PVC, for example.

The choice of this low lamination temperature makes it possible to considerably reduce the deformations of the plastic materials, or even avoid them and thus not alter the visual appearance of the metallized film.

According to a second variant, this protective layer is formed by a protective varnish.

The deposition of the varnish is performed by deposition methods known to the person skilled in the art such as by silkscreen printing or by inkjet technology, or by spraying.

According to other variant embodiments, the central layer 114 is composed of a substrate 126 provided with an antenna embedded in its thickness and a second support layer 116*b*. To this end, the central layer 114 is formed by the assembly of two distinct substrates, one intended to receive the printing, the other bearing the antenna.

The assembly of the layers according to the method described above makes it possible to obtain one or more cards with a metallized effect 118 while dispensing with the presence of two layers with low shrinkage ratio as was known from the prior art.

In addition to the advantages presented previously, the invention facilitates the adhesion of the print layer 122*b* on the central layer. Indeed, in the prior art structures illustrated by FIG. 1, the printing is deposited on a layer of PET 20*a*, 20*b* which exhibits poor adhesion properties. It is then necessary to add a primer before the deposition of the print layer 22*a*, 22*b*. This increases the production costs of the card.

The exemplary embodiments considered above are described on the basis of a list of materials given by way of example but which are nonlimiting.

The invention claimed is:

1. A method for fabricating a metallized assembly for a microcircuit card having a metallized effect, the metallized assembly forming an internal layer of the microcircuit card, the method comprising providing a support layer comprising a plastic material sensitive to heat and exhibiting a first shrinkage ratio, the support layer having, on a surface, at least dimensions of the microcircuit card, providing a metallized film held on a first non-adhesive bearing liner, the first non-adhesive bearing liner exhibiting a shrinkage ratio less than that of the support layer, transferring the metallized film onto the support layer by applying heat and pressure on the surface of the support layer, and removing the first non-adhesive bearing liner.

2. The method of claim 1, further comprising, prior to the transferring, passing the support layer and the metallized film between two rollers in a continuous manner, two plates in a sheet-by-sheet manner, or between a roller and a plate, wherein a dimension of a surface of each recited roller and of each recited plate is at least equal to a dimension of the microcircuit card.

3. The method of claim 1, wherein the transferring the metallized film is performed by applying heat and pressure on a surface covering at least all of the support layer.

4. The method of claim 1, wherein the transferring is performed at a temperature greater than a glass transition temperature of the support layer and is between 90° C. and 170° C.

5. The method of claim 1, wherein the support layer is made of a material selected from the group consisting of PVC, a mixture of PVC-ABS, PC, and PETg.

6. The method of claim 1, wherein the first non-adhesive bearing liner is made of PET.

7. The method of claim 1, further comprising positioning at least one central layer covered by a print layer on a side of the support layer opposite to the metallized film, positioning a transparent overlay substrate on a side of the at least one central layer opposite to the support layer, the transparent overlay substrate being configured to form an outer face of the microcircuit card, positioning a second bearing liner on top of the metallized film, the second bearing liner exhibiting a shrinkage ratio less than that of the support layer, laminating at a temperature higher than a glass transition temperature of the support layer, and removing the second bearing liner.

8. The method of claim 7, wherein the second bearing liner is a sheet of PET.

9. The method of claim 7, further comprising printing on the metallized film.

10. The method of claim 7, further comprising depositing varnish on the metallized film.

11. The method of claim 7, further comprising adding a transparent overlay layer on the metallized film, and laminating at a temperature lower than the glass transition temperature of the support layer.

12. The method of claim 7, wherein the at least one central layer covered by a print layer comprises a substrate comprising an antenna.

* * * * *